United States Patent
Shinoda et al.

(10) Patent No.: US 11,836,906 B2
(45) Date of Patent: Dec. 5, 2023

(54) IMAGE PROCESSING SYSTEM AND COMPUTER PROGRAM FOR PERFORMING IMAGE PROCESSING

(71) Applicant: Hitachi High-Tech Corporation, Tokyo (JP)

(72) Inventors: Shinichi Shinoda, Tokyo (JP); Yasutaka Toyoda, Tokyo (JP); Shigetoshi Sakimura, Tokyo (JP); Masayoshi Ishikawa, Tokyo (JP); Hiroyuki Shindo, Tokyo (JP); Hitoshi Sugahara, Tokyo (JP)

(73) Assignee: HITACHI HIGH-TECH CORPORATION, Tokyo (JP)

(*) Notice: Subject to any disclaimer, the term of this patent is extended or adjusted under 35 U.S.C. 154(b) by 0 days.

(21) Appl. No.: 17/503,438

(22) Filed: Oct. 18, 2021

(65) Prior Publication Data
US 2022/0036116 A1   Feb. 3, 2022

Related U.S. Application Data

(63) Continuation of application No. 16/493,432, filed as application No. PCT/JP2018/010307 on Mar. 15, 2018, now Pat. No. 11,176,405.

(30) Foreign Application Priority Data

Mar. 27, 2017  (JP) .................. 2017-060351

(51) Int. Cl.
*G06T 7/00*  (2017.01)
*G06V 10/772*  (2022.01)
(Continued)

(52) U.S. Cl.
CPC .......... *G06T 7/0002* (2013.01); *G06V 10/772* (2022.01); *G06V 10/774* (2022.01); *G06V 10/98* (2022.01); *G06T 2207/20081* (2013.01)

(58) Field of Classification Search
CPC ........ G06T 7/0002; G06T 2207/20081; G06V 10/772; G06V 10/774; G06V 10/98
(Continued)

(56) References Cited

U.S. PATENT DOCUMENTS

2005/0084155 A1   4/2005  Yumoto et al.
2011/0106734 A1   5/2011  Boult et al.
(Continued)

FOREIGN PATENT DOCUMENTS

JP   05-054195 A   3/1993
JP   6-50738 A    2/1994
(Continued)

OTHER PUBLICATIONS

Notification of Reason for Refusal dated Nov. 18, 2021, issued in corresponding Korean Application No. 10-2021-7027367.
(Continued)

*Primary Examiner* — Ayodeji O Ayotunde
(74) *Attorney, Agent, or Firm* — MATTINGLY & MALUR, PC

(57) ABSTRACT

An object of the present invention is to achieve both suppression of data amount of an image processing system that learns a collation image to be used for image identification using a discriminator and improvement of identification performance of the discriminator. In order to achieve the above object, there is proposed an image processing system including a discriminator that identifies an image using a collation image, the image processing system further including a machine learning engine that performs machine learning of collation image data required for image identification. The machine learning engine searches for a successfully identified image using an image for which identification has been failed, and adds information, obtained based on a partial image of the image for which identification has been
(Continued)

failed and which has been selected by an input device to the successfully identified image obtained by the search to generate corrected collation image data.

6 Claims, 10 Drawing Sheets

(51) Int. Cl.
*G06V 10/774* (2022.01)
*G06V 10/98* (2022.01)

(58) Field of Classification Search
USPC .......................................................... 382/159
See application file for complete search history.

(56) References Cited

U.S. PATENT DOCUMENTS

| | | | | |
|---|---|---|---|---|
| 2013/0088499 | A1* | 4/2013 | Sato | G06F 16/90324 345/501 |
| 2013/0202184 | A1* | 8/2013 | Grove | G06T 7/13 382/136 |
| 2013/0336542 | A1 | 12/2013 | Ishiyama | |
| 2015/0262370 | A1 | 9/2015 | Minato et al. | |
| 2017/0127048 | A1 | 5/2017 | Nobayashi et al. | |
| 2022/0284239 | A1 | 9/2022 | Takahashi et al. | |

FOREIGN PATENT DOCUMENTS

| | | |
|---|---|---|
| JP | 6-333008 A | 12/1994 |
| JP | 10-063789 A | 3/1998 |
| JP | 2007-052575 A | 3/2007 |
| JP | 2011-214903 A | 10/2011 |
| JP | 2016-099668 A | 5/2016 |
| KR | 10-1034117 B | 5/2011 |
| TW | 201626478 A | 7/2016 |
| WO | 2016/147652 A1 | 9/2016 |

OTHER PUBLICATIONS

Alex Krizhevsky, et al., "Image Net Classification with Deep Convolutional Neural Networks", Advances In Neural Information Processing Systems, vol. 25, pp. 1106-1114, 2012.
Taiwanese Office Action (Application No. 107109018), dated Feb. 19, 2019.
International Search Report of PCT/JP2018/010307 dated Jun. 5, 2018.
Taiwanese Office Action received in corresponding Taiwanese Application No. 108122862 dated Jan. 7, 2020.
Japanese Office Action received in corresponding Japanese Application No. 2020-094126 dated Jun. 29, 2021.
Japanese Office Action received in corresponding Japanese Application No. 2022-181486 dated Sep. 26, 2023.
Yang, Jimei et al., "Object Contour Detection with a Fully Convolutional Encoder-Decoder Network", IEEE Conference on Computer Vision and Pattern Recognition, 2016.

* cited by examiner

LEARNING IMAGE DATA

IDENTIFICATION SUCCESS IMAGE DATA

DIFFERENCE DATA SELECTED FROM FAILURE IMAGE

IMAGE PROCESSING SYSTEM AND COMPUTER PROGRAM FOR PERFORMING IMAGE PROCESSING

TECHNICAL FIELD

The present disclosure relates to an image processing system and a computer program that cause an image discriminator, which performs image identification based on image information, to perform machine learning, and particularly to an image processing system and a computer program that cause an image discriminator, which identifies an image to be collated, to perform machine learning using a collation image.

BACKGROUND ART

Conventionally, an image analysis technique has been used in which a feature value is extracted from an image and compared and collated with information, which has been registered in a database or the like in advance, to determine an object. A neural network and a support vector machine have been known as a machine learning algorithm to discriminate an object. In either method, identification accuracy largely varies depending on which feature value is selected, and thus, a method of selecting the feature value has become important.

In recent years, a deep learning device called a convolutional neural network (CNN) has been developed and attracting attention (NPL 1). The CNN is a type of machine learning device, and is a mechanism which allows a system to automatically extract and learn features of an image and determine what an object is. Since the system also automatically extracts the selection of the feature value that has been regarded as important up to now, it is considered that it will be important, from now on, what kind of learning data is to be prepared. PTL 1 and PTL 2 introduce a technique that enables determination robust against noise by adding noise to learning data for learning.

CITATION LIST

Patent Literature

PTL 1: JP H5-54195 A
PTL 2: JP H10-63789 A

Non-Patent Literature

NPL 1: Alex Krizhevsky, Ilya Sutskever, and Geoffrey E Hinton, "Image Net Classification with Deep Convolutional Neural Networks", Advances in Neural Information Processing Systems, Vol. 25, pp. 1106 to 1114, 2012.

SUMMARY OF INVENTION

Technical Problem

In machine learning, a large amount of learning data is used to improve identification performance. There is even a case where it takes several weeks to several months to prepare a large amount of learning data and perform learning using the large amount of learning data. It is conceivable to improve identification performance by introducing machine learning even to a discriminator that identifies an image output by a scanning electron microscope (SEM) used for semiconductor inspection or measurement in accordance with a purpose of inspection or measurement. However, even if the machine learning is performed in advance using learning data, it is necessary to perform additional learning to cope with a new type of image accompanying contrast reduction, luminance unevenness, noise, or the like (hereinafter referred to as a disturbance) caused by charging specific to the SEM at the time of performing actual semiconductor inspection.

It is necessary to create a correct determination result (hereinafter, a true value) corresponding to an image for preparation of learning data, and the work of creating true values corresponding to a large amount of learning data takes time and labor. In addition, the learning time for learning is also required depending on a scale of learning data, and thus, there is a concern on learning using a large amount of learning data since there is a risk of interference with the operation of production lines.

Therefore, proposed are an image processing system and a computer program that aim to suppress the amount of learning data and shorten learning time by specifying a disturbance, which causes a failure, using an image for which has actually failed in identification and an image that has actually been successfully identified and creating learning data limited to the disturbance.

Solution to Problem

According to one aspect of the present invention, there is proposed an image processing system including an arithmetic processing device that identifies an image using a collation image, the image processing system further including: a display device that displays the image; an input device that selects a part of the image; a memory that stores collation image data to identify the image; a machine learning engine that performs machine learning of the collation image data required for image identification of the arithmetic processing device, in which the machine learning engine uses an image for which identification by the arithmetic processing device has failed to search an image which has been successfully identified by the arithmetic processing device and stored in the memory, and adds information, obtained based on a partial image of the image for which identification has failed and which has been selected by the input device, to the successfully identified image obtained by the search to generate corrected collation image data.

In addition, as another aspect for achieving the above object, there is proposed a computer-readable recording medium storing a computer command to be executed by a processor, the computer command causing the processor: to execute search of data of an image to be collated which has been successfully identified using data of a collation image by using data of an image to be collated for which the identification using the data of the collation image has failed in order to generate learning data of a discriminator that identifies the image to be collated using the collation image; and to add information, obtained by partially selecting the image to be collated for which identification has failed, to the data of the image to be collated, which has been successfully identified and obtained by the search, to generate corrected collation image data.

Advantageous Effects of Invention

According to the above configuration, it is possible to realize both the suppression of the amount of learning data and the improvement of the identification performance of the discriminator.

DESCRIPTION OF EMBODIMENTS

Hereinafter, a description will be given regarding an image processing system that updates a collation image of a discriminator, which identifies an image to be collated using the collation image, by machine learning or a computer program that causes an arithmetic processing device to execute the update, the image processing system and the computer program that perform: a similar image process of searching for an image (hereinafter referred to as a success image), which has been successfully identified, similar to an image for which identification using the discriminator has failed (hereinafter referred to as a failure image); a disturbance specifying process of obtaining difference information calculated by a comparison based on image information of the failure image and the success image searched by a similar image search unit; and a disturbance image generation process of creating an image based on the difference information calculated in the disturbance specifying process.

According to the above configuration, it is possible to save time and effort for work of creating a true value of learning data, to reduce the amount of learning data, and to shorten the learning time.

The image generation device exemplified in embodiments described hereinafter relates to an image generation method and an image generation device configured to achieve the reduction of the amount of learning data and shortening of the learning time in additional learning in a semiconductor inspection utilizing machine learning. In addition, as a specific example thereof, an example in which learning image data is generated using image data for which identification has failed and a successfully identified image will be described.

Hereinafter, a device having a function of generating learning data in additional learning in a semiconductor inspection utilizing machine learning and a measurement inspection system will be described with reference to the drawings. More specifically, a device and a system that include a critical dimension-scanning electron microscope (CD-SEM), which is a type of measurement device, will be described.

Incidentally, a charged particle beam device is illustrated as a device forming an image, and an example in which an SEM is used has been described as one aspect thereof in the following description, but the invention is not limited thereto, but a focused ion beam (FIB) device, which scans an ion beam on a sample to form an image may be adopted as the charged particle beam device, for example. However, extremely high magnification is required in order to accurately measure a pattern which has been decreased in dimension, and thus, it is generally desirable to use the SEM which is superior to the FIB device in terms of a resolution.

Figure 21:
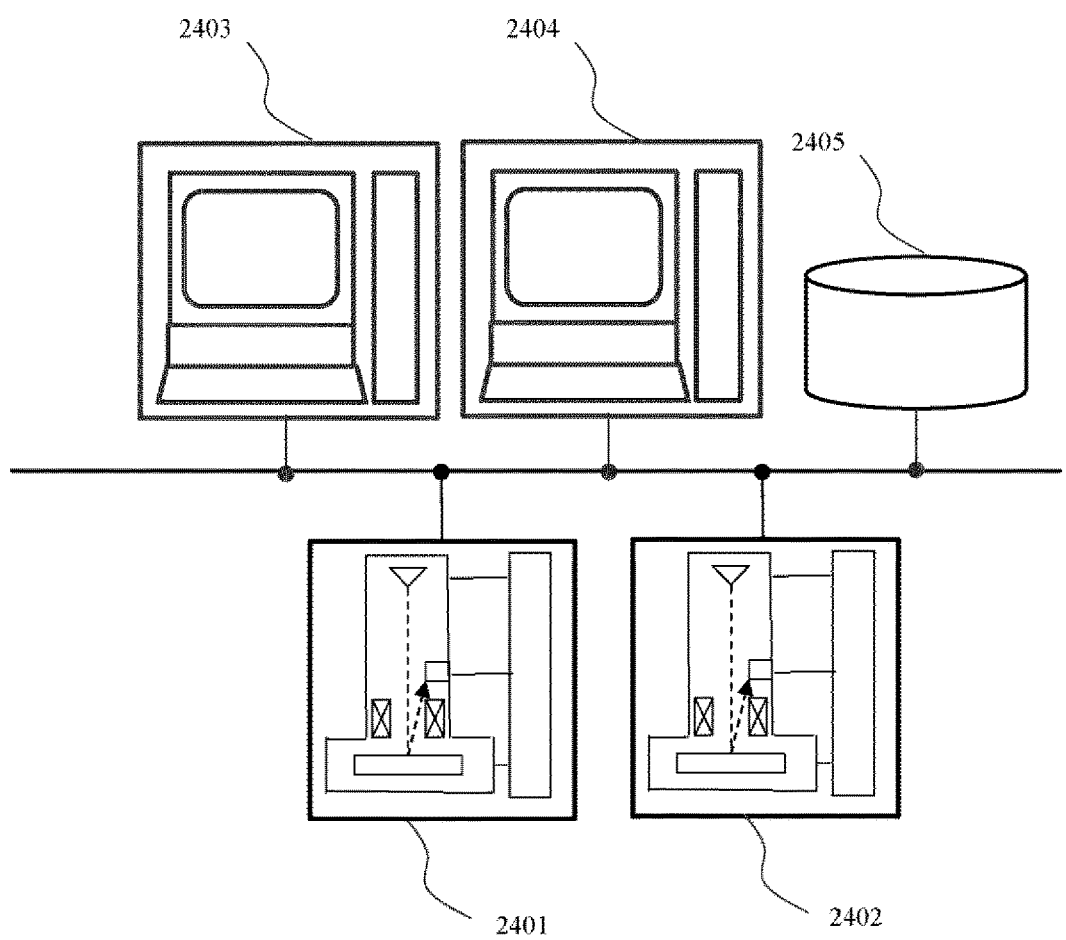
FIG. 21 is a view for describing an example of a semiconductor measurement system.

FIG. 21 is a schematic explanatory view of a measurement and inspection system in which a plurality of measurement or inspection devices are connected to a network. The system is configured such that a CD-SEM 2401, which mainly measures pattern dimensions of a semiconductor wafer, a photomask, or the like, and a defect inspection device 2402, which irradiates a sample with an electron beam to acquire an image and extracts a defect based on a comparison between the image and a reference image registered in advance, are connected to the network. In addition, a condition setting device 2403 which sets a measurement position, a measurement condition, and the like on design data of a semiconductor device, a simulator 2404 which performs simulation of performance of a pattern based on the design data of the semiconductor device, a manufacturing condition of a semiconductor manufacturing device, or the like, and a storage medium 2405 which stores the design data in which layout data and a manufacturing condition of the semiconductor device are registered are connected to the network. The condition setting device 2403 is provided with a display device that displays a graphical user interface (GUI) image as described later and an input device that inputs necessary information.

The design data is expressed, for example, in a GDS format or an OASIS format, and is stored in a predetermined format. Incidentally, the design data may be of any type as long as software to display the design data can display the format and the design data can be handled as graphic data. In addition, the storage medium 2405 may be incorporated in a control device of the measurement device or the inspection device, the condition setting device 2403, or the simulator 2404. Incidentally, the CD-SEM 2401 and the defect inspection device 2402 are provided with control devices, respectively, such that control required for each device is performed, and these control devices may be equipped with a function of the above-described simulator and a function of setting a measurement condition and the like. In the SEM, an electron beam released from an electron source is focused by a plurality of lenses, and the focused electron beam is scanned one-dimensionally or two-dimensionally on the sample by a scanning deflector.

A secondary electron (SE) or a backscattered electron (BSE) released from the sample by the scanning of the electron beam is detected by a detector and stored in a storage medium such as a frame memory in synchronization with the scanning of the scanning deflector. Image signals stored in the frame memory are integrated by an arithmetic device mounted in the control device. In addition, the scanning by the scanning deflector can be performed for arbitrary size, position, and orientation.

The above-described control or the like is performed by the control device of each SEM, and an image or a signal obtained as a result of the scanning of the electron beam is sent to the condition setting device 2403 via a communication line network. Incidentally, the control device controlling the SEM and the condition setting device 2403 are described as separate bodies in this example, but the invention is not limited thereto, but the control and measurement processing may be performed collectively by the condition setting device 2403 or the control of the SEM and the measurement processing may be performed together in each control device.

In addition, a program configured to execute the measurement processing is stored in the condition setting device 2403 or the control device, and measurement or calculation is performed according to the program.

In addition, the condition setting device 2403 has a function of creating a program (a recipe) to control an operation of the SEM based on semiconductor design data, and functions as a recipe setting unit. Specifically, a position and the like to perform processing required for the SEM, such as a desired measurement point, auto focus, auto stigma, and an addressing point, are set on design data, pattern contour line data, or design data which has been subjected to simulation, and a program to automatically control a sample stage, a deflector, and the like of the SEM is created based on the setting. In addition, in order to create a template, which will be described later, a processor, which extracts information of an area to form a template from the design data and creates the template based on the extracted information, or a program to cause a general-purpose processor to create a template is incorporated or stored.

Figure 22:
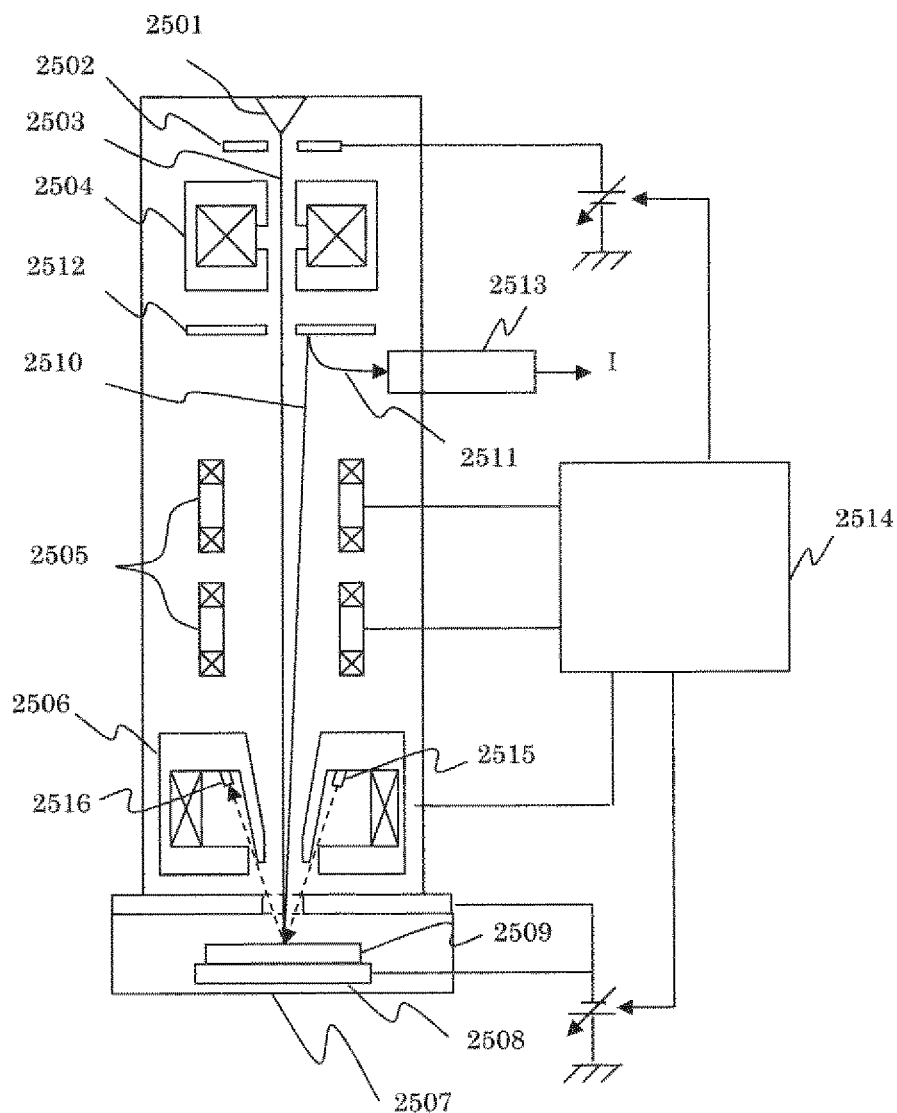
FIG. 22 is a schematic explanatory view of a scanning electron microscope.

FIG. 22 is a schematic block diagram of a scanning electron microscope. An electron beam 2503 extracted from an electron source 2501 by an extraction electrode 2502 and accelerated by an acceleration electrode (not illustrated) is condensed by a condenser lens 2504, which is a mode of a focusing lens, and then, is one-dimensionally or two-dimensionally scanned on a sample 2509 by a scanning deflector 2505. The electron beam 2503 is decelerated by a negative voltage applied to an electrode incorporated in a sample stage 2508 and is focused by lens action of an objective lens 2506 to be emitted onto the sample 2509. When the sample 2509 is irradiated with the electron beam 2503, electrons 2510 such as secondary electrons and backscattered electrons are released from such an irradiation portion. The released electrons 2510 are accelerated toward the electron source by acceleration action based on a negative voltage applied to the sample, and collide with a conversion electrode 2512 to generate secondary electrons 2511. The secondary electrons 2511 released from the conversion electrode 2512 are captured by a detector 2513, and an output I of the detector 2513 changes according to the amount of the captured secondary electrons. A luminance of the display device (not illustrated) changes in accordance with the output I. For example, in the case of forming a two-dimensional image, a deflection signal to the scanning deflector 2505 and the output I of the detector 2513 are synchronized to form an image of a scanning area. Further, the scanning electron microscope illustrated in FIG. 22 is provided with a deflector (not illustrated) that moves the scanning area of the electron beam.

Incidentally, an example in which electrons released from the sample are converted once by the conversion electrode and then detected is described in the example illustrated in FIG. 22, but it is a matter of course that the invention is not limited to such a configuration, and it is also possible to adopt a configuration, for example, in which a detection surface of an electron multiplying tube or the detector is arranged on a track of the accelerated electron. The control device 2514 has a function of controlling each configuration of the scanning electron microscope and forming an image based on detected electrons and a function of measuring a pattern width of a pattern formed on a sample based on an intensity distribution of detected electrons called line profile. Next, an aspect of an image generation device 1 that creates learning image data for contour line extraction using machine learning will be described. The image generation device includes a dedicated processor or a general-purpose processor, and is controlled by a program that generates learning image data to be described later in the case of the general-purpose processor. The image generation device functions as a machine learning engine. The machine learning can also be executed by an arithmetic device incorporated in the control device 2514 or incorporating image processing. It is also possible to cause an external arithmetic device (for example, the condition setting device 2403) to execute the machine learning via a network.

Figure 1:
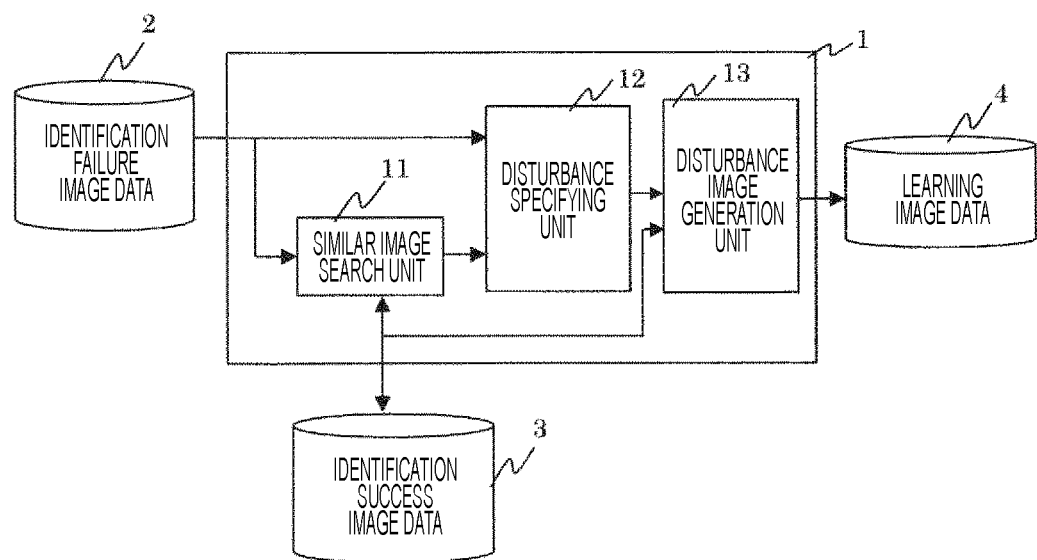
FIG. 1 is a diagram illustrating an embodiment of an image generation device.

FIG. 1 is a diagram for describing an example of the image generation device that generates learning image data. An image generation device 1 creates learning image data 4 using data 2 of an image for which identification has failed (hereinafter referred to as an identification failure image) and data 3 of an image which has been successfully identified (hereinafter referred to as an identification success image). First, a similar image search unit 11 searches for image data similar to the identification failure image out of the identification success image data 3 using the identification failure image data 2.

Then, a disturbance specifying unit 12 compares the identification failure image data 2 with the identification success image data searched by the similar image search unit 11 to investigate whether there is a disturbance that is greatly different due to a disturbance such as reduction in contrast caused by charging, uneven luminance, and noise. The identification failure image and the identification success image are compared in terms of a contrast, a luminance change, and noise to specify a disturbance having a large difference.

Then, a disturbance image generation unit 13 adds the difference of the disturbance specified by the disturbance specifying unit 12 to the identification success image data to generate an image, and stores the image as learning image data 4. Since the image has been successfully identified, a true value has been created at the time of identification, and no true value creation work occurs. In addition, the disturbance generated in the identification failure image is reflected in the identification success image, the resultant identification success image is used as the learning image data to perform learning using the CNN so that it is also possible to identify the identification failure image after learning. When learning image data is created by assigning a true value to an identification failure image and adding an assumed disturbance, a disturbance that does not actually occur is added to perform learning, and thus, redundant learning data is included in the created learning image data. In the present embodiment, the actually occurring disturbance is specified by the comparison with the success image, and the learning image data limited to the disturbance is created. Thus, the amount of learning data can be reduced, and a learning time can be shortened. It is considered that identification failure image data is created by designating an image that a person has visually confirmed an identification result image and determined that the image has failed.

Figure 2:
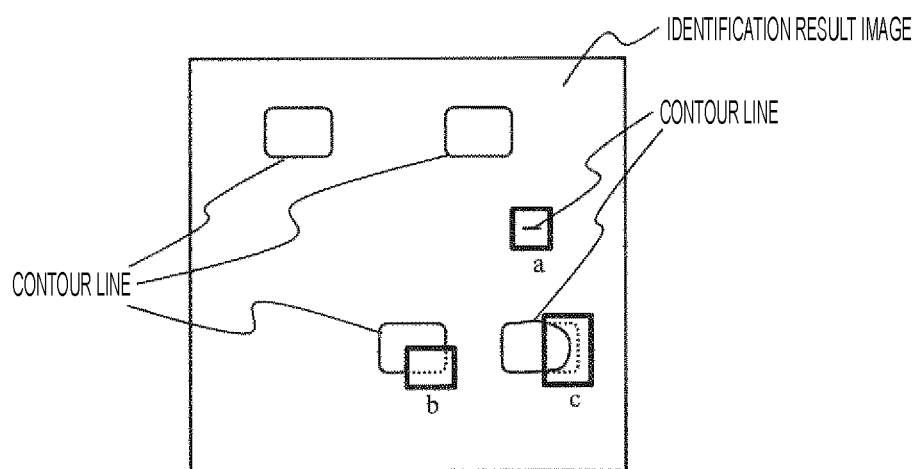
FIG. 2 is a view illustrating an embodiment of a GUI screen of the image generation device.

FIG. 2 illustrates an example of a GUI at the time of visually confirming the identification result image in contour line extraction using learning. A GUI screen is displayed, for example, on a display device of the condition setting device 2403, and necessary information is input by an input device such as a pointing device and a keyboard. In FIG. 2, an identification result is displayed for each closed figure pattern.

In this example, an identification target is a rectangular pattern with four rounded corners, and if a contour line thereof can be extracted/identified, a matching score with a collation image becomes high, and an identification success image is obtained. An identification failure image includes an area extracted at a place where no contour line appears, such as a bold rectangle a, a non-extracted area at a place where a contour line appears, such as b, or an area where a and b are generated close to each other, such as c, and thus, the matching score with the collation image decreases, and identification fails.

It is desirable that a discriminator to be described later be programmed so as to register a target of which score reaches a certain degree but is insufficient for identification as a success image, for example, as an identification failure image in order to execute machine learning based on the image for which the identification has failed. For example, scores for identification are set such that a score Ths for success in matching>a range Thf1 to Thf2 of scores to be taken as a failure image>a score Thof that needs to be determined obviously as a failure, and an image to be collated having a score of Thf1 to Thf2 is preferably identified as image data for machine learning at the time of determining a degree of similarity, and stored in a predetermined storage medium. As a user displays only an area of an identification failure image to be indicated using a rectangle, all the other areas not indicated by rectangles can be regarded as success image areas (identification success images). Rectangular frames of a, b, c can be superimposed and displayed as areas of images for which identification has failed (identification failure images) on the displayed identification result so that it is possible to perform setting while visually confirming the result.

The work of assigning a true value for contour line extraction/identification using machine learning also takes into consideration a direction of a white band, and the true value of the contour line is assigned while confirming a peak position, which takes an extremely long time. Thus, it is considered that it is desired to eliminate the work of assigning the true value if possible.

The similar image search unit 11 searches for identification success image data similar to identification failure image data. It is conceivable to search for an image having a high degree of similarity by matching processing using a normalized correlation of images.

Figure 3:
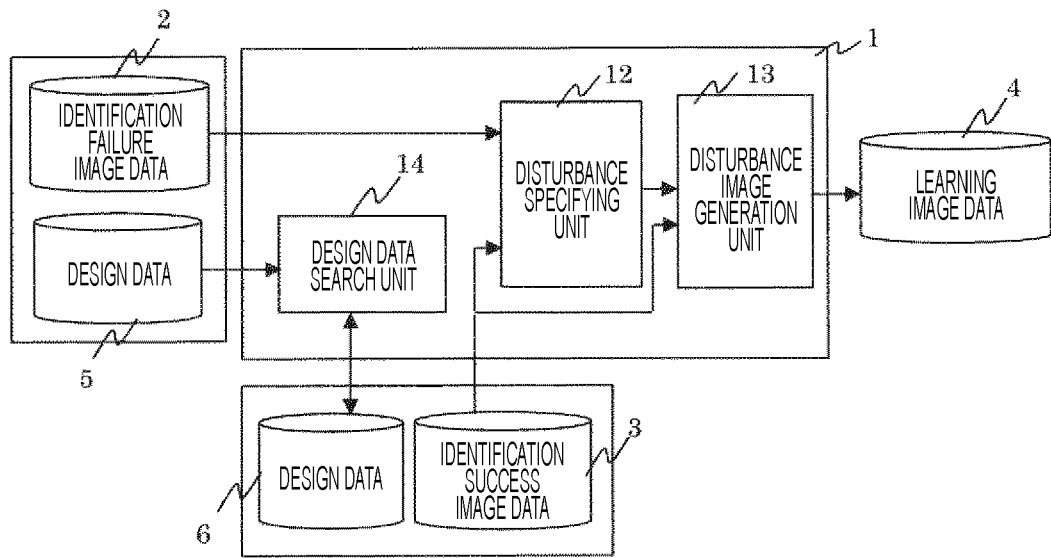
FIG. 3 is a diagram illustrating an embodiment of an image generation device.

In addition, it is also conceivable to search for identification success image data similar to identification failure image data by using design data 5 corresponding to an identification failure image and obtaining design data corresponding to an identification success image similar to the design data 5 as illustrated in FIG. 3.

Figure 23:
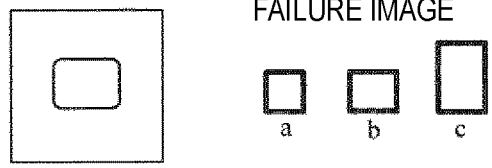
FIG. 23 is a view illustrating an example of learning image data.

In addition, a plurality of identification targets are present in one image in many cases as illustrated in FIG. 2, and thus, it is also conceivable to search an identification success image similar to an identification failure image from within one image of an identification result image. FIG. 23 is a view illustrating an example of learning image data including a success image and a partial failure image selected on the GUI screen. The learning image data is stored in a memory in association with success image data and image data of a designated portion of a failure image. A composite image obtained by combining a success image and a partial failure image may be stored in the stored data to perform collation processing using the composite image (corrected collation image), or a success image and a partial failure image may be combined to generate a collation image at the time of performing image identification.

Figure 4:
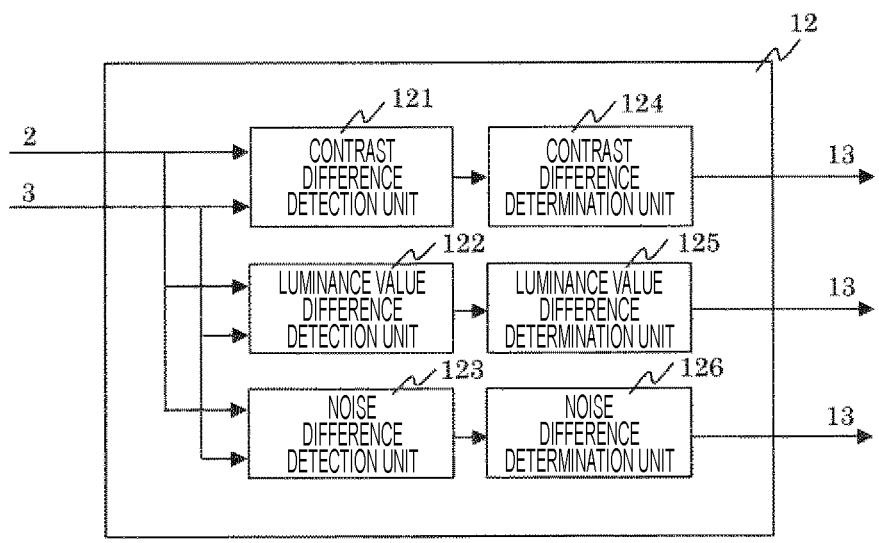
FIG. 4 is a diagram illustrating an embodiment of a disturbance specifying unit.

FIG. 4 is a diagram for describing an example of the disturbance specifying unit 12. A contrast is calculated from each of the identification failure image 2 and the identification success image 3, and a difference therebetween is obtained by a contrast difference detection unit 121. Then, a contrast difference determination unit 124 determines whether the contrast is greatly different between the identification failure image 2 and the identification success image 3. A luminance value difference detection unit 122 obtains a difference between luminance values of the identification failure image 2 and the identification success image 3. Then, a luminance value difference determination unit 125 determines whether the luminance value is greatly different between the identification failure image 2 and the identification success image 3. A noise difference detection unit 123 obtains a difference between noise amounts of the identification failure image 2 and the identification success image 3. Then, a noise difference determination unit 126 determines whether the noise is greatly different between the identification failure image 2 and the identification success image 3.

Figure 5:
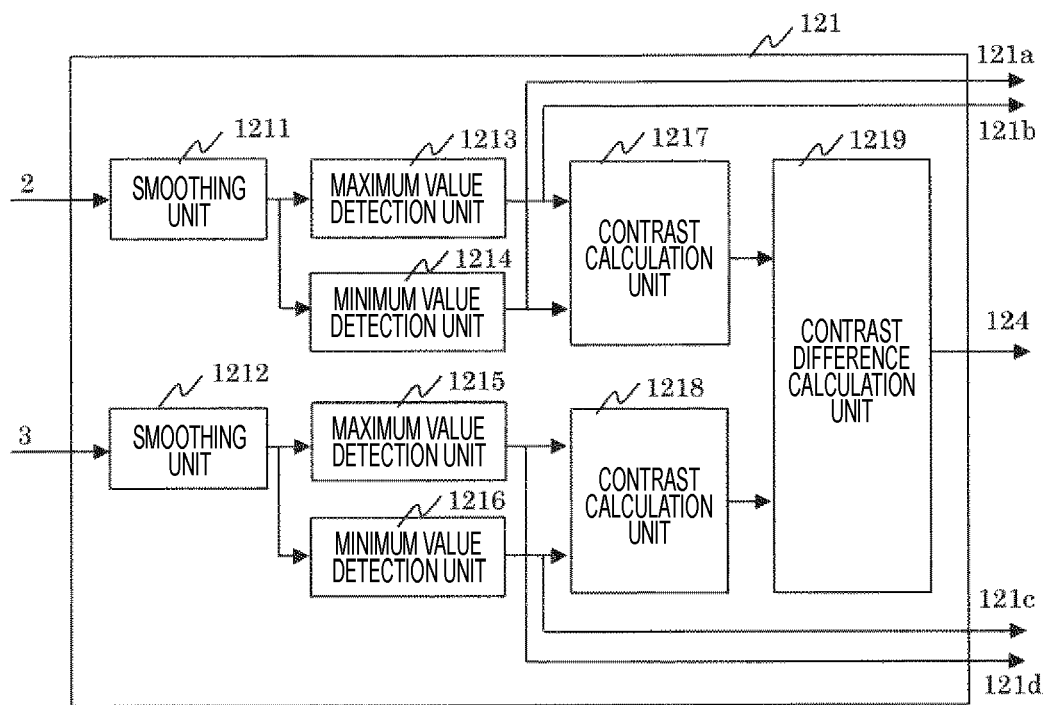
FIG. 5 is a diagram illustrating an embodiment of a contrast difference detection unit.
Figure 6:
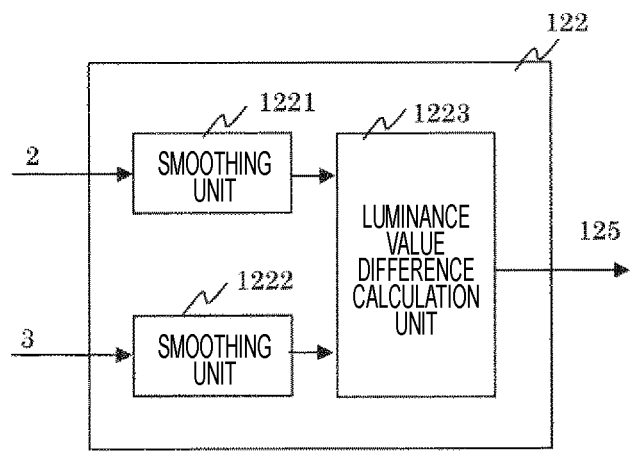
FIG. 6 is a diagram illustrating an embodiment of a luminance value difference detection unit.
Figure 7:
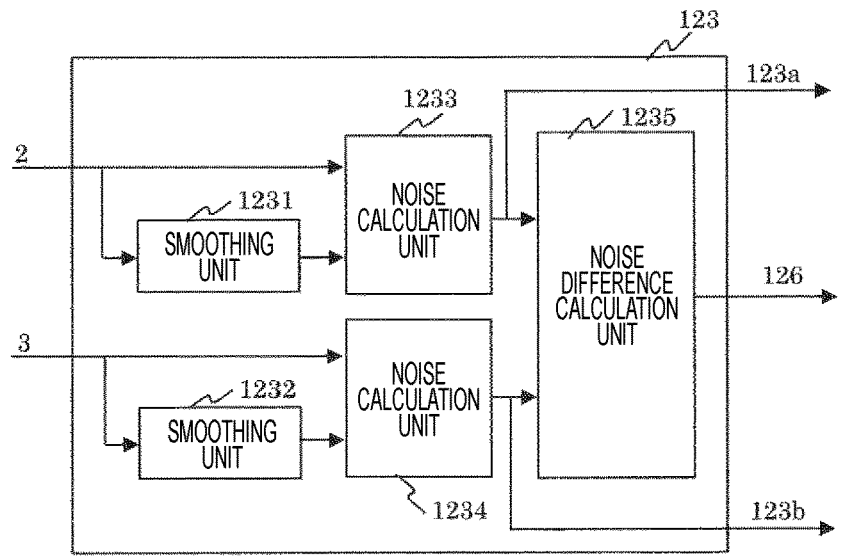
FIG. 7 is a diagram illustrating an embodiment of a noise difference detection unit.

FIG. 5 is a diagram for describing an example of the contrast difference detection unit 121. A smoothing unit 1211 performs image smoothing on the identification failure image 2 using a smoothing filter or the like to remove a sharp noise component of the luminance value of the image. Thereafter, a maximum value detection unit 1213 and a minimum value detection unit 1214 obtain a maximum value Lmax and a minimum value Lmin of the luminance value of the image. A contrast calculation unit calculates (Lmax Lmin)/(Lmax+Lmin) using the maximum value Lmax and the minimum value Lmin. Similarly, a contrast calculation unit 1218 calculates a contrast for the identification success image 3, and a contrast difference calculation unit 1219 obtains a difference between the respective contrasts. The method of obtaining the contrast is not limited to this example, and a difference between the maximum value and the minimum value may be used as a contrast in each of the identification failure image 2 and the identification success image 3. In either case, the difference between the maximum value and the minimum value is used to determine the contrast. FIG. 6 is a diagram for describing an example of the luminance value difference detection unit 122. Smoothing is sufficiently performed on the identification failure image 2 and the identification success image 3 by smoothing units 1221 and 1222 using a smoothing filter or the like to obtain a gradual luminance change of the images. Thereafter, a difference between the luminance values of the respective images is calculated by a luminance value difference calculation unit 1223. FIG. 7 is a diagram for describing an example of the noise difference detection unit 123. Smoothing is performed on the identification failure image 2 and the identification success image 3 by smoothing units 1231 and 1232 using a smoothing filter or the like to remove noise components, noise calculation units 1233 and 1234 calculate each difference in the luminance value between each of the identification failure image 2 and the identification success image 3 and each of the images after having been subjected to the smoothing units 1231 and 1232, and a variation of such a difference value is calculated as noise. A noise difference calculation unit 1235 calculates a difference value between each obtained noise.

Figure 8:
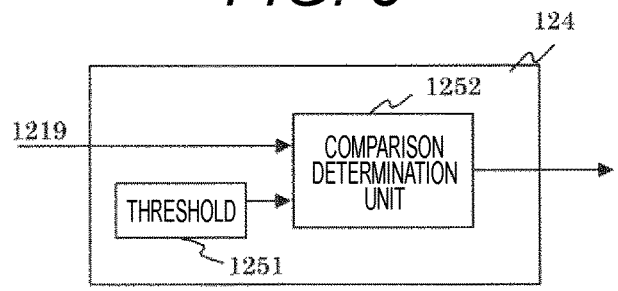
FIG. 8 is a diagram illustrating an embodiment of a contrast difference determination unit.

FIG. 8 is a diagram for describing an example of the contrast difference determination unit 124. A threshold 1251 is set in advance to determine whether a difference in contrast is large, and a value of the contrast difference output from the contrast difference detection unit 121 and the threshold are compared in a comparison determination unit 1252. If the contrast difference is larger than the threshold 1251, a value "1" is output, and "0" is output otherwise.

In addition, a threshold for determination is set in advance in each of the luminance value difference determination unit 125 and the noise difference determination unit 126 similarly to the contrast difference determination unit 124, and determination is made in comparison with the threshold. If a difference is larger than a threshold, a value of the difference in luminance value and a value of the difference in noise are output. Otherwise, "0" is output. In such a case, it is conceivable to reset each of subsequent image generation operations and to output a signal not to permit storage of the learning image data 4.

In addition, when all the differences in the contrast, luminance value, and noise are not large, the user is notified of such a fact. Then, in such a case, the work of assigning the true value is performed on the identification failure image to set the identification failure image as the learning image data.

Figure 9:
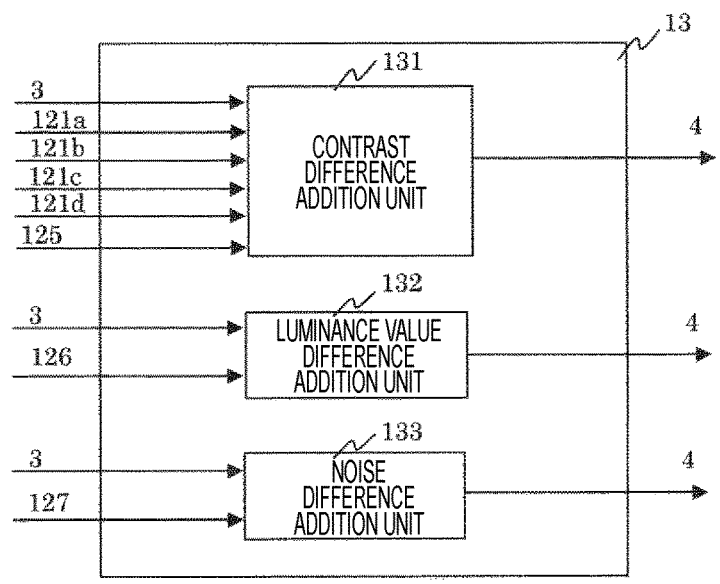
FIG. 9 is a diagram illustrating an embodiment of disturbance image generation.

FIG. 9 is a diagram for describing an example of the disturbance image generation unit 13. When the disturbance specifying unit 12 determines that a contrast difference is large, a contrast difference addition unit 131 adds the contrast difference to the identification success image 3 to generate an image. In addition, when the disturbance specifying unit 12 determines that a difference in luminance value is large, a luminance difference addition unit 132 adds the luminance value difference to the identification success image 3 to generate an image. When the disturbance specifying unit 12 determines that a difference in noise is large, the noise difference addition unit 133 adds the noise difference to the identification success image 3 to generate an image.

Figure 10:
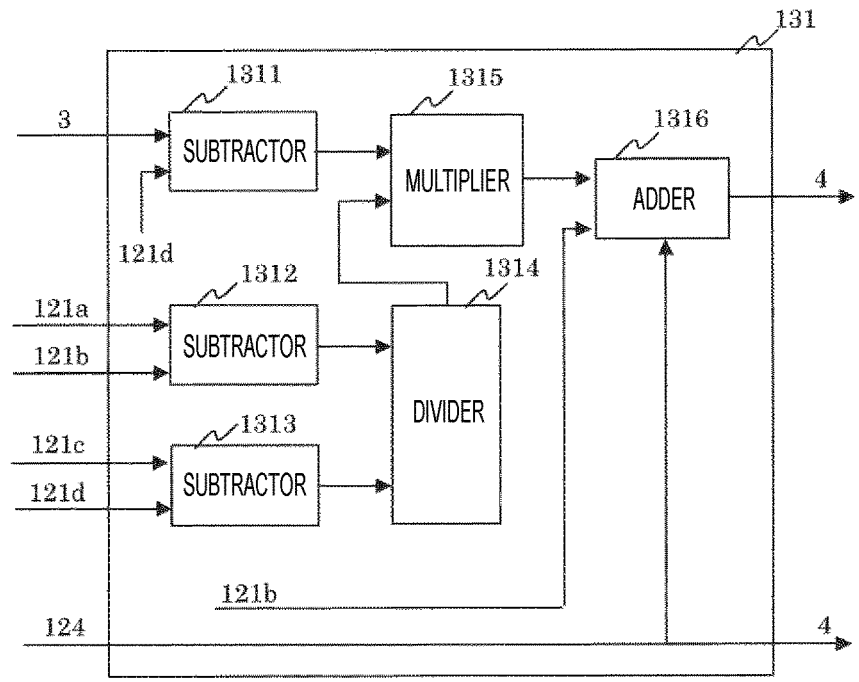
FIG. 10 is a diagram illustrating an embodiment of a contrast difference addition unit.

FIG. 10 is a diagram for describing an example of the contrast difference addition unit 131. A subtractor 1312 obtains (maximum value-minimum value) of the identification failure image 2, a subtractor 1313 obtains (maximum value-minimum value) of the identification success image 3, and a divider 1314 obtains (maximum value-minimum value of identification failure image 2)/(maximum value-minimum value of identification success image 3). Then, a multiplier 1315 multiplies an image obtained by subtracting the minimum value obtained from the identification success image by a subtractor 1311 by the value of (maximum value-minimum value of identification failure image 2)/(maximum value-minimum value of identification success image 3) obtained by the divider 1314. Thereafter, the minimum value of the identification failure image 2 is added by an adder to realize the contrast difference addition.

Figure 11:
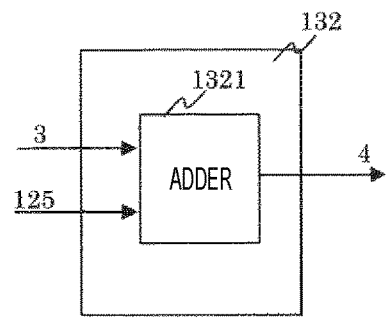
FIG. 11 is a diagram illustrating an embodiment of a luminance value difference addition unit.

The luminance value difference addition unit 132 adds the luminance value difference obtained by the disturbance specifying unit 12 to the identification success image 3 by an adder 1321 to generate an image as illustrated in FIG. 11. For example, it is possible to add luminance unevenness in which the background becomes dark due to charging generated in the failure image, to the success image.

Figure 12:
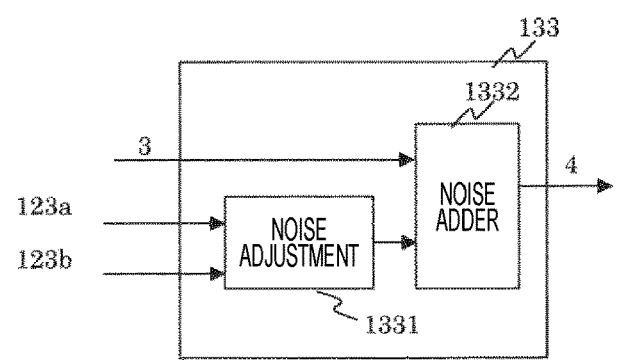
FIG. 12 is a diagram illustrating an embodiment of a noise difference addition unit.
Figure 13:
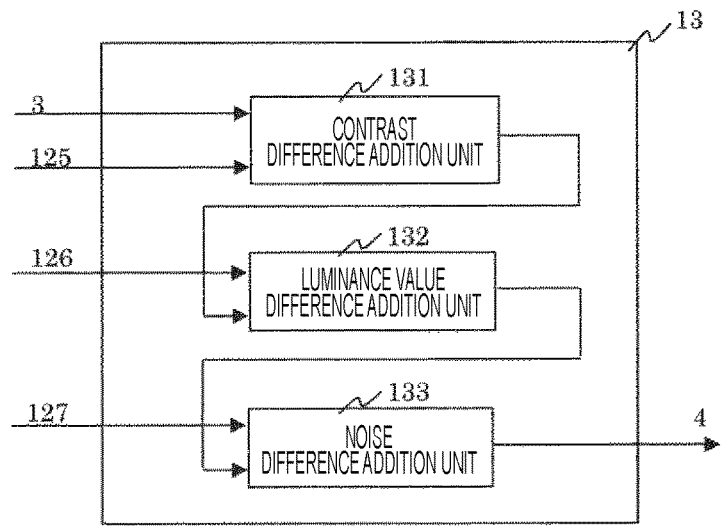
FIG. 13 is a diagram illustrating an embodiment of disturbance image generation.

FIG. 12 is a diagram for describing an example of the noise difference addition unit 133. The noise difference addition unit 133 adds noise, created by noise adjustment 1331 based on noise 123a of the identification failure image 2 and noise 123b of the identification success image 3 obtained by the disturbance specifying unit 12, to the identification success image by an adder 1332 to generate an image. The noise adjustment 1331 adds the noise so as to take into consideration the noise already present in the identification success image 3. For example, when the noise 123a of the identification failure image 2 is generated with a normal distribution, only noise that has a value larger than a value of the noise 123b of the identification success image 3 is added. In addition, when the noise 123a of the identification failure image 2 is generated with a normal distribution, the noise 123b of the identification success image 3 is similarly generated with a normal distribution, and a difference between absolute values thereof is added as noise. When the noise of the identification success image 3 is larger than the noise of the identification failure image 2, it is conceivable that the noise to be added is 0. Although images are created in a division manner by the contrast difference addition unit 131, the luminance difference addition unit 132, and the noise difference addition unit 133 in the above description, it is also conceivable to create a combined image by the respective units as illustrated in FIG. 13. First, the contrast difference addition unit 131 adds the contrast difference to the failure image, and then, the luminance value difference addition unit 132 adds the luminance value difference. Finally, the noise difference addition unit 133 adds the noise difference. The order of these processes may be reversed. As a result, it is possible to create an image to which the contrast, the luminance value, and the noise have been added.

Figure 14:
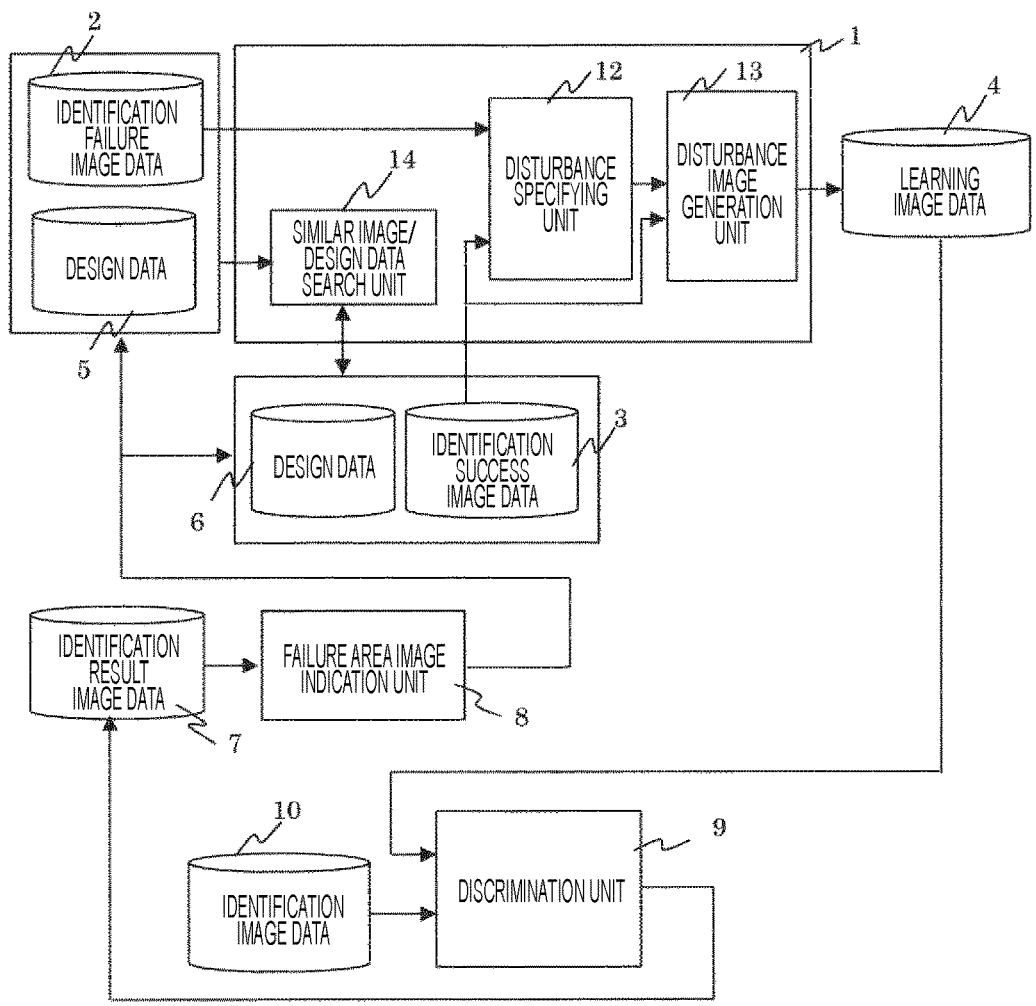
FIG. 14 is a diagram illustrating an embodiment of a discrimination unit and an image generation device.

FIG. 14 is a diagram for describing an example of an image generation device also including a discrimination unit. A discrimination unit 9 that has already been learned identifies an image of identification image data 10 and stores an identification result in identification result image data 7.

The discrimination unit 9 is an arithmetic processing device that executes image processing to identify an image using a collation image stored in advance in a memory. More specifically, a degree of similarity between an image to be collated and the collation image is determined, and an image as a search target is searched based on such a score. For example, an image having a score of a predetermined value or more is identified as a search target image. The image identified as the search target image is stored, as an identification success image, in a predetermined storage medium, but an image having a score less than the predetermined value is stored, as an identification failure image, in a predetermined storage medium for subsequent machine learning.

As described in FIG. 2, it is assumed that it is possible to extract a contour line of a rectangular with four rounded corners if an identification target can be identified by the rectangular pattern with the four rounded corners.

Image data of the identification result image data 7 is displayed on the GUI by a failure area image indication unit 8 as illustrated in FIG. 2. When an identification failure image area is indicated in an identification result image displayed on the GUI by a user using the failure area image indication unit 8, the indicated image area is stored in the identification failure image data 2. In addition, an image area that is not indicated, for example, the image area where the contour line of the rectangular with the four rounded corners illustrated in FIG. 2 has been extracted is stored in the identification success image data 3. The image generation unit 1 generates learning image data using the identification failure image data and the identification success image data. A similar image/design data search unit 14 of the image generation device 1 searches for a success image similar to the identification failure image data 2. The identification success image which is highly similar to the identification failure image is searched using design data or image data. Then, the disturbance specifying unit 12 compares the searched identification success image data and the identification failure image data to specify a disturbance (contrast, luminance change, or noise) having a large difference. Then, an image obtained by reflecting the specified disturbance in the identification success image 3 is generated by the disturbance image generation unit 13 and stored in the learning image data 4. The discriminator 9 performs learning using the image data stored in the learning image data 4. With the learning using the success image obtained by adding the disturbance to the image for which identification has failed, it is possible to perform identification robust against the disturbance generated in the image for which identification has failed.

Figure 15:
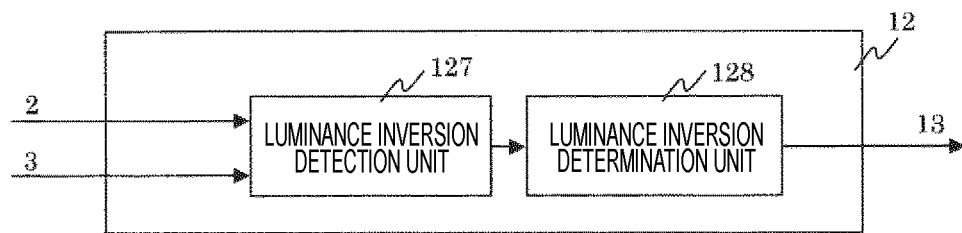
FIG. 15 is a diagram illustrating an embodiment of a disturbance specifying unit.

Although the disturbance in the case of using the SEM image has been described above, a disturbance such as inversion of a luminance occurs depending on a process in the case of using an OM image, for example. In such a case, the disturbance specifying unit 12 is required to have a function of detecting the disturbance of luminance inversion as illustrated in FIG. 15. A luminance inversion detection unit 127 detects the luminance inversion using an image of the identification failure image 2 and an image of the identification success image 3, and a luminance inversion determination unit 128 determines whether the luminance inversion has occurred.

Figure 16:
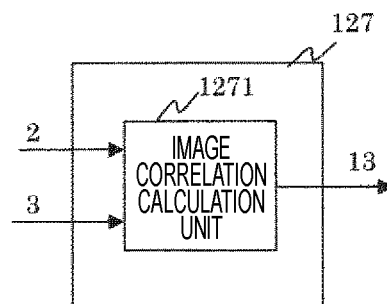
FIG. 16 is a diagram illustrating an embodiment of a luminance inversion detection unit.
Figure 17:
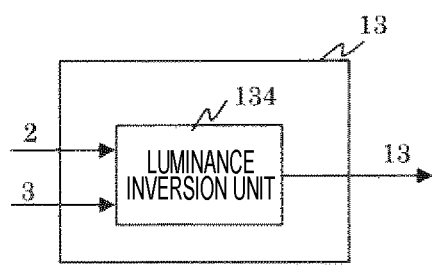
FIG. 17 is a diagram illustrating an embodiment of a luminance inversion and addition unit.

In the luminance inversion detection unit 127, an image correlation calculation unit 1271 calculates an image correlation between the identification failure image 2 and the identification success image 3 as illustrated in FIG. 16. If the luminance inversion occurs, a negative correlation becomes large. The luminance inversion determination unit 128 can determine that the inversion is occurring when the negative correlation is larger than a threshold as compared with the threshold set in advance. In addition, the above-described disturbance image generation unit 13 is provided with a luminance inversion unit 134 illustrated in FIG. 17, and an image in which a luminance value is inverted with respect to an identification success image is generated when the luminance inversion determination unit 128 determines that the luminance inversion is occurring.

Figure 18:
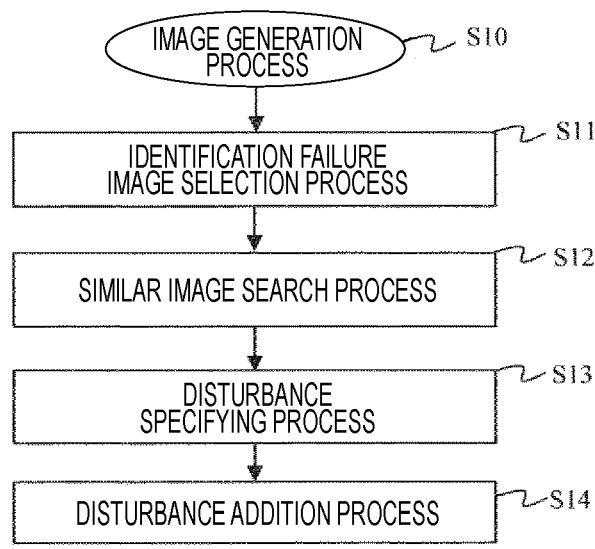
FIG. 18 is a diagram illustrating an embodiment of an image generation process.
Figure 19:
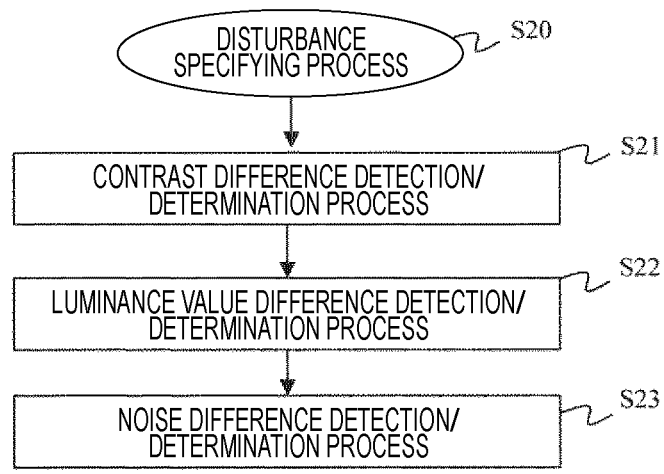
FIG. 19 illustrates an embodiment of a disturbance specifying process.

FIG. 18 illustrates an example of an image generation process. In an image generation process S10, an image which fails in identification is first selected in an identification failure image selection process S11. As described with reference to FIG. 2, processing is performed in which a user selects an image area for which identification has failed (hereinafter referred to as an identification failure image) from among identification result images. Subsequently, in a similar image search process S12, an identification success image similar to the identification failure image selected in the identification failure image selection process S11 is searched from among successfully identified image data. Then, in a disturbance specifying process S13, disturbances such as a contrast, a luminance change, and noise are compared between the identification failure image and the identification success image to specify the disturbance that is greatly different between the identification failure image and the identification success image. Then, an image obtained by reflecting the disturbance specified in the disturbance specifying process S13 in the identification success image is generated in a disturbance addition process S14. FIG. 19 illustrates an example of a disturbance specifying process. In the disturbance specifying process S20, the contrast is first calculated from each of the identification failure image and the identification success image in a contrast difference detection/determination process S21, and a difference therebetween is obtained to perform magnitude determination between the difference value and a specific threshold. When the difference value is larger than the specific threshold, it is determined that the disturbance of the contrast is largely different between the identification failure image and the identification success image.

In a luminance value difference detection/determination process S22, a difference in image (luminance value) between the identification failure image and the identification success image is obtained to perform magnitude determination between the difference value and a specific threshold. When the difference value is larger than the specific threshold, it is determined that the disturbance of luminance unevenness is greatly different between the identification failure image and the identification success image.

In a noise difference detection/determination process S23, a difference in noise intensity between the identification failure image and the identification success image is obtained to perform magnitude determination between the difference value and a specific threshold. When the difference value is larger than the specific threshold, it is determined that the disturbance of noise is greatly different between the identification failure image and the identification success image.

Here, the contrast difference detection/determination process S21, the luminance value difference detection/determination process S22, and the noise difference detection/determination process S23 are performed in this order, but the order thereof may be random.

Figure 20:
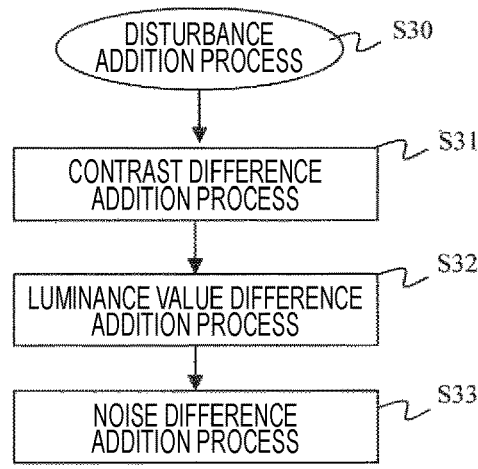
FIG. 20 illustrates an embodiment of a disturbance addition process.

FIG. 20 illustrates an example of the disturbance addition process. In a disturbance addition process S30, a contrast difference addition process S31, a luminance value difference addition process S32, and a noise difference addition process S33 are performed. In the contrast difference addition process S31, the contrast of the identification success image is matched to the contrast of the identification failure image when it is determined in the contrast difference detection/determination process S21 that the disturbance of the contrast is greatly different between the identification failure image and the identification success image. Specifically, the same content as described with reference to FIGS. 5, 9 and 10 is applied.

In the luminance value difference addition process S32, each of the identification failure image and the identification success image is intensively smoothed to obtain a difference image between the identification failure image and the identification success image, and an image is created by adding the difference image to the identification success image when it is determined in the luminance value difference detection/determination process S22 that the disturbance of luminance unevenness is greatly different between the identification failure image and the identification success image. The same content as described with reference to FIGS. 6 and 11 is applied.

In the noise difference addition process S33, an image is created by adding noise occurring in the identification failure image to the identification success image when it is determined in the noise difference detection/determination process S23 that the disturbance of noise is greatly different between the identification failure image and the identification success image. The same content as described with reference to FIGS. 7 and 12 is applied.

Here, the contrast difference addition process S31, the luminance value difference addition process S32, and the noise difference addition process S33 are performed in this order, but the order thereof may be random.

REFERENCE SIGNS LIST

1 image generation device
2 identification failure image data
3 identification success image data
4 learning image data
5 design data
6 design data
7 identification result image data
8 failure area image indication unit
9 discrimination unit
10 identification image data
11 similar image search unit
12 disturbance specifying unit
13 disturbance image generation unit
121 contrast difference detection unit
122 luminance difference detection unit
123 noise difference detection unit
124 contrast difference determination unit
125 luminance difference determination unit
126 noise difference determination unit
127 luminance inversion detection unit
128 luminance inversion determination unit
131 contrast difference addition unit
132 luminance difference addition unit
133 noise difference addition unit
134 luminance inversion unit
121*a* maximum value of identification failure image
121*b* minimum value of identification failure image
121*c* maximum value of identification success image
121*d* minimum value of identification success image
123*a* noise of identification failure image
123*b* noise of identification success image

The invention claimed is:

1. An image processing system extracts form information of object in an image from image data comprising:
   a computer system that including a discriminator,
   wherein the computer system searches for an identification success image which is similar to an identification failure image, compares the searched identification success image data and the identification failure image data, generates said image based on the comparison, and stores said image as said image data,
   wherein said discriminator learns said image data and pattern contour line data line data that are included in said image data, as learning data,
   wherein said discriminator creates a contour line from said image data at the time of identification, and
   wherein said computer system outputs said form information by inputting said image data to said discriminator.

2. The image processing system according to claim 1, further comprising:
   an input device that designates position on said image,
   wherein said computer system creates said pattern contour line data based on position information that designated on said image, by said input device.

3. The image processing system according to claim 2, wherein said input device adds a true value to partial image of said image for which identification has been failed by said discriminator.

4. The image processing system according to claim 3, further comprising:
   a display device that displays identification result and said image.

5. The image processing system according to claim 2, wherein said input device is able to designate image area, and
   wherein said computer system analyses said designated image area and creates said learning data based on analysis result.

6. The image processing system according to claim 5, wherein
   said computer system determines whether said input device adds a true value or not, based on said analysis result.

* * * * *